United States Patent [19]
Imaseki et al.

[11] Patent Number: 5,005,131
[45] Date of Patent: Apr. 2, 1991

[54] SLIP CONTROL DEVICE FOR DIFFERENTIAL

[75] Inventors: Takashi Imaseki; Yuji Kobari, both of Zushi, Japan

[73] Assignee: Nissan Motor Co., Ltd., Yokohama, Japan

[21] Appl. No.: 247,466

[22] Filed: Sep. 21, 1988

[30] Foreign Application Priority Data

Sep. 29, 1987 [JP] Japan .................. 62-245685

[51] Int. Cl.$^5$ .............................................. B60T 8/32
[52] U.S. Cl. ............................. 364/426.02; 180/197
[58] Field of Search ............ 364/424.1, 426.02, 426.03; 361/238; 303/96, 98; 180/197, 247–249, 233

[56] References Cited

U.S. PATENT DOCUMENTS

| | | | |
|---|---|---|---|
| 3,596,730 | 8/1971 | Cecce | 180/79.2 |
| 3,724,289 | 4/1973 | Kennicutt | 74/11 |
| 4,344,139 | 8/1982 | Miller et al. | 364/426.03 |
| 4,349,233 | 9/1982 | Bullard et al. | 180/197 |
| 4,420,059 | 12/1983 | Suzuki | 180/248 |
| 4,473,143 | 9/1984 | Windsor | 192/0.052 |
| 4,497,397 | 2/1985 | Windsor et al. | 192/0.076 |
| 4,558,414 | 12/1985 | Sakakiyama | 364/424.1 |
| 4,583,627 | 4/1986 | Kumura et al. | 192/0.076 |
| 4,613,008 | 9/1986 | Hiraiwa et al. | 180/247 |
| 4,664,216 | 5/1987 | Kodama et al. | 180/233 |
| 4,679,463 | 7/1987 | Ozaki et al. | 74/711 |
| 4,715,466 | 12/1987 | Ishii et al. | 180/233 |
| 4,750,125 | 6/1988 | Leppek et al. | 180/197 |
| 4,757,870 | 7/1988 | Torii et al. | 180/233 |
| 4,790,404 | 12/1988 | Naito | 180/197 |
| 4,830,132 | 5/1989 | Inagaki et al. | 180/197 |

FOREIGN PATENT DOCUMENTS

| | | |
|---|---|---|
| 64669 | 11/1982 | European Pat. Off. . |
| 182312 | 5/1986 | European Pat. Off. . |
| 2245701 | 3/1973 | Fed. Rep. of Germany . |
| 2022469 | 11/1979 | Fed. Rep. of Germany . |
| 3345470 | 7/1984 | Fed. Rep. of Germany . |
| 3434395 | 5/1985 | Fed. Rep. of Germany . |
| 3427725 | 8/1985 | Fed. Rep. of Germany . |
| 3437436 | 8/1986 | Fed. Rep. of Germany . |
| 58-56922 | 4/1983 | Japan . |
| 61-67629 | 4/1986 | Japan . |
| 61-157437 | 7/1986 | Japan . |
| 61-157438 | 7/1986 | Japan . |
| 61-193931 | 8/1986 | Japan . |
| 62-103226 | 5/1987 | Japan . |
| 62-103227 | 5/1987 | Japan . |
| 62-241732 | 10/1987 | Japan . |
| 62-273129 | 11/1987 | Japan . |
| 700355 | 11/1979 | U.S.S.R. . |
| 1110967 | 8/1984 | U.S.S.R. . |
| 1120132 | 10/1984 | U.S.S.R. . |
| 2102907 | 2/1983 | United Kingdom . |
| 2104178 | 3/1983 | United Kingdom . |
| 2118666 | 11/1983 | United Kingdom . |
| 2167718 | 6/1986 | United Kingdom . |
| 2167824 | 6/1986 | United Kingdom . |

*Primary Examiner*—Gary Chin
*Attorney, Agent, or Firm*—Foley & Lardner

[57] ABSTRACT

A differential is provided with a clutch variable in engagement for producing a slip limiting force for limiting a differential action even during cornering of a vehiocle. A force for urging the clutch for engagement is reduced for thereby reducing the slip limiting force in response to increase of a driving wheel slip during cornering of the vehicle.

3 Claims, 3 Drawing Sheets

SLIP CONTROL DEVICE FOR DIFFERENTIAL

BACKGROUND OF THE INVENTION

1. Field of the Invention

The present invention relates in general to differentials for automotive vehicles and more particularly to a slip control device for a differential.

2. Description of the Prior Art

A known slip control device for a differential includes a hydraulically operated friction clutch unit which is variably engaged for varying a differential action as disclosed in Japanese Provisional Patent Publication Nos. 62-103226 and 62-103227.

In order to retain a sufficient supply of a driving force to the driving wheels during cornering of the vehicle, it is desirable for the clutch unit to be engaged more strongly, i.e., it is desirable to increase a slip limiting force (i.e., a force supplied to the clutch unit to limit a slip thereof and therefore a differential action) during cornering of the vehicle.

The prior art slip control device is constructed, for example, so that a slip limiting force is determined by a curve radius and a centripetal acceleration of a cornering vehicle. While such a slip control device makes it possible to retain a sufficient supply of a driving force to the driving wheels and thereby improve the power supplying characteristic during cornering of the vehicle, it encounters problems in that the roll of the vehicle during power slide running thereof becomes so large and that when the cornering inside driving wheel (i.e., the driving wheel nearer to the center of the cornering curve than the other of the paired driving wheels) is caused to rotate at a speed larger than the cornering outside driving wheel (i.e., the driving wheel remoter from the center of the cornering curve than the other of the paired driving wheels) an excessive oversteer is caused, making it difficult to drive the vehicle safely.

That is, an understeer which is desirable from the safety driving point of view is obtained when the cornering inside driving wheel is not lifted above the ground to slip but held in contact with the ground together with the cornering outside driving wheel. However, when the cornering inside driving wheel is lifted to slip with a slip limiting force being largely maintained, a driving force distributed to the cornering outside driving wheel becomes considerably larger than that to the cornering inside driving wheel, thus causing an excessive oversteer.

SUMMARY OF THE INVENTION

In accordance with the present invention, there is provided a method of controlling a slip of a differential for a wheeled vehicle. The differential is of the type incorporating a clutch variable in engagement for producing a slip limiting force for limiting a differential action even during cornering of the vehicle. The method comprises detecting a driving wheel slip during cornering of the vehicle and reducing a force urging the clutch for engagement and thereby reducing the slip limiting force in response to increase of the driving wheel slip.

In accordance with the present invention, there is also provided a slip control device for a differential which comprises clutch means for supplying a slip limiting force to the differential to limit a differential action thereof, detecting means for detecting a driving wheel slip and control means for controlling engagement of the clutch means in such a way that the slip limiting force reduces in response to increase of the detected driving wheel slip.

The above method and device are effective for overcoming the above noted disadvantages and shortcomings inherent in the prior art device.

It is accordingly an object of the present invention to provide a slip control device for a differential which can improve the driveability and controllability of the vehicle at the same time.

It is another object of the present invention to provide a slip control device of the above described character which makes it possible to drive the vehicle safely even during high-speed cornering of the vehicle.

It is a further object of the present invention to provide a slip control device of the above described character which can sufficiently supply a driving force to the driving wheels during cornering of the vehicle without deteriorating the controllability of the vehicle.

It is a further object of the present invention to provide a slip control device of the above described character which is desirable and useful from the safety driving point of view.

It is a further object of the present invention to provide a method of controlling a slip of a differential for a wheeled vehicle, which is of the above described character.

DESCRIPTION OF THE PREFERRED EMBODIMENTS

Figure 1:
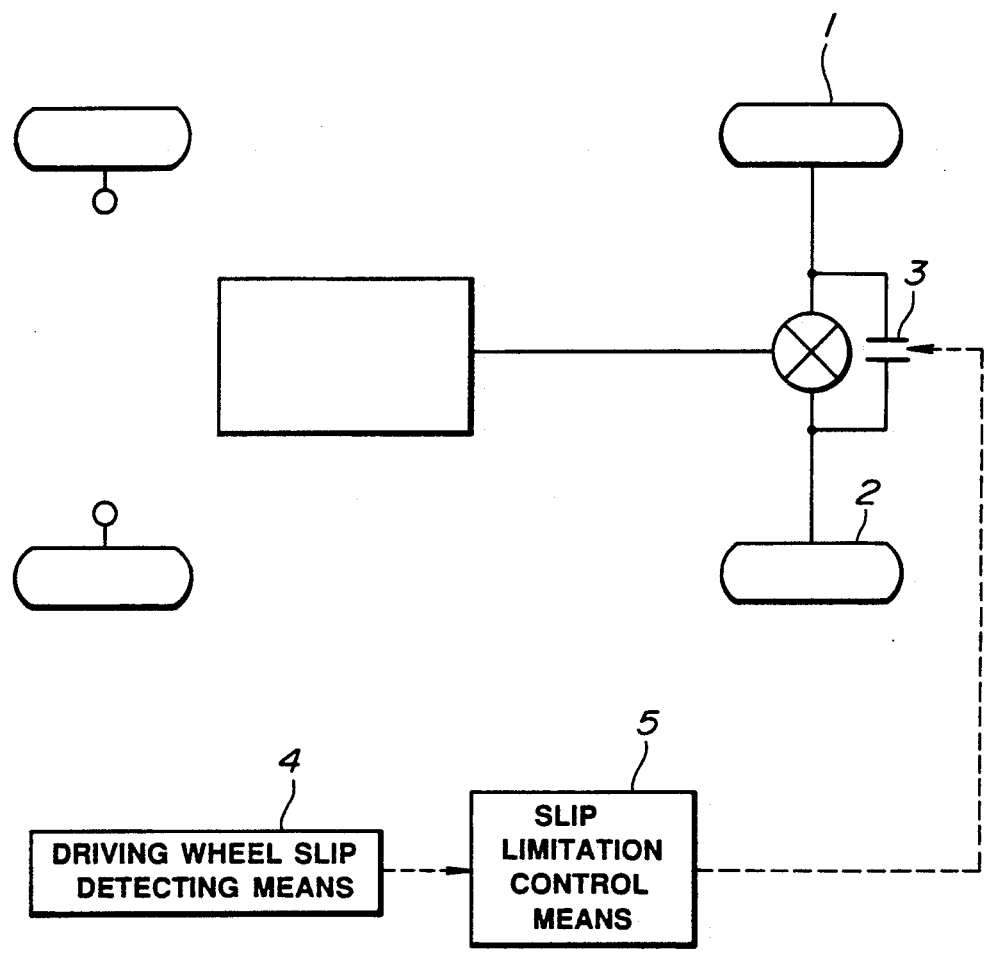
FIG. 1 is a diagrammatic view of a slip control device for a differential according to an embodiment of the present invention.

Referring to FIG. 1, a slip control device for a differential according to an embodiment of the present invention is shown as comprising a slip limiting clutch unit 3 variable in engagement for varying a slip limiting force and therefore a differential action between left and right driving wheels 1 and 2. The slip limiting clutch unit 3 is adapted to provide the left and right driving wheels 1 and 2 with a slip limiting force even during cornering of the vehicle thereby improving the power supplying characteristic during cornering of the vehicle. The slip control device further comprises a driving wheel slip detecting means 4 for detecting a driving wheel slip and a slip limitation control means 5 for reducing the aforementioned slip limiting force in response to the driving wheel slip detected by the detecting means 4.

In operation, when the cornering inside driving wheel 1 or 2 is lifted above the ground to slip during power sliding running of the vehicle, the slip of the driving wheel 1 or 2 is detected by the driving wheel slip detecting means 4. The slip limitation control means 5 then reduces the slip limiting force in response to the detected driving wheel slip.

Accordingly, when a driving wheel slip occurs, the slip limiting force is reduced in proportion to the driving wheel slip, thus reducing the driving force distributed to the cornering outside driving wheel 1 or 2. By this, the moment acting on the vehicle to be causative of an oversteer is reduced, whereby it becomes possible to prevent an excessive oversteer.

Figure 2:
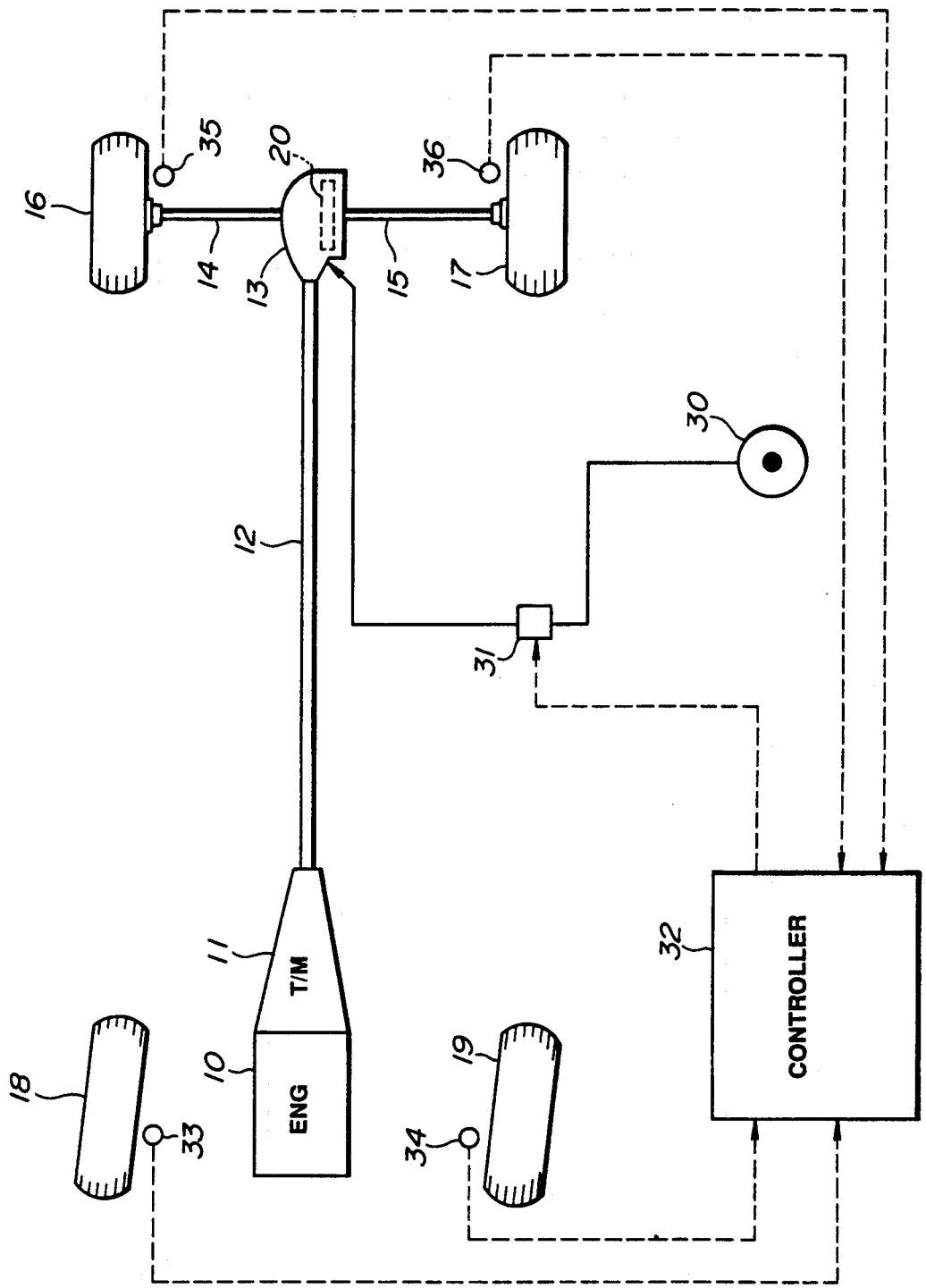
FIG. 2 is a schematic view of a rear drive vehicle incorporating a slip control device for a differential according to another embodiment of the present invention.
Figure 3:
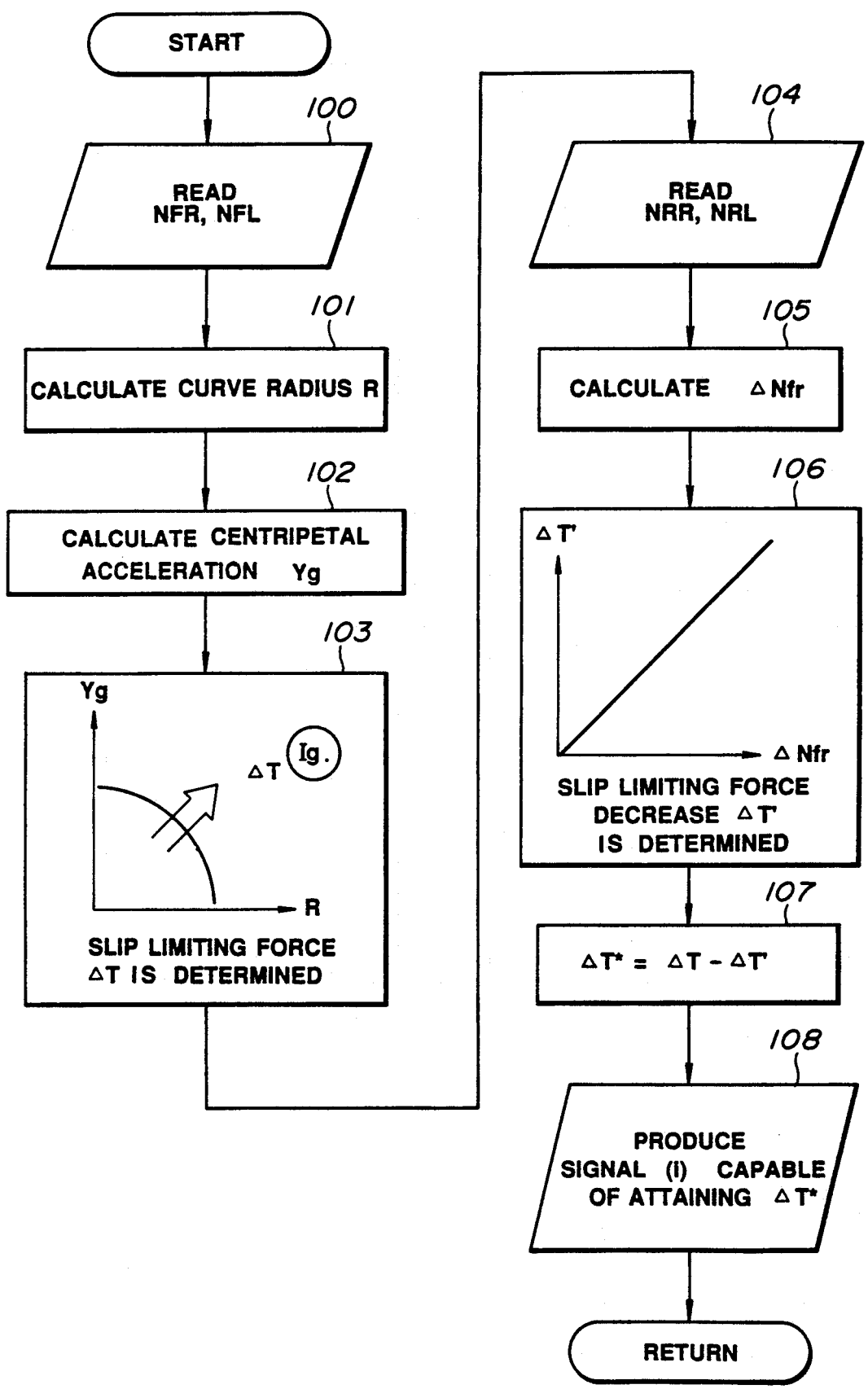
FIG. 3 is a flow chart depicting a control routine of a controller employed in the slip control device of FIG. 2.

Referring to FIGS. 2 & 3, the present invention will be described more in detail.

In the figures, a slip control device for a differential is shown as being applied to a front engine-rear drive vehicle which is provided with an engine 10, transmission 11, propeller shaft 12, differential 13, drive axles 14, 15, rear driving wheels 16, 17 and front dirigible wheels 18, 19.

The differential 13 incorporates, in a manner similar to the prior art, a slip limiting clutch unit 20 (e.g., an hydraulically operated multiple disk wet clutch unit or friction clutch unit) which is engaged with a varying engagement force and thereby vary a slip limiting force $\Delta T$ for limiting a differential action between the rear driving wheels 16 and 17. The slip limiting force $\Delta T$ is varied by introducing a pressurized oil from a pressurized oil source 30 to the slip limiting clutch unit 20 through a slip limitation control valve 31.

The slip limitation control valve 31 is controlled by a controller 32 which consists of an electronic control circuit responsive to signals from front wheel speed sensors 33 and 34. That is, the front wheel speed sensors 33 and 34 detect the rotation speeds of the left and right front wheels 18 and 19 (when viewed from the front of the vehicle) and supply signals representing the detected front wheel speeds to the controller 32.

The left front wheel speed NFL and the right front wheel speed NFR detected by the left and right front wheel speed sensors 33 and 34, respectively are used as an input information for determining a curve radius R and a centripetal acceleration Yg of a cornering vehicle. The slip limiting force $\Delta T$ is determined by the curve radius R and the centripetal acceleration Yg.

Further, the left front wheel speed NFL and the right front wheel speed NFR are used together with a left rear wheel speed NRL (detected by a left rear wheel speed sensor 35 when viewed from the front of the vehicle) and a right rear wheel speed NRR (detected by a right rear wheel speed sensor 36 when viewed from the front of the vehicle) are used as an input information of the controller 32 for determining a driving wheel slip $\Delta Nfr$. The driving wheel slip $\Delta Nfr$ is used for determining a slip limiting force decrease $\Delta T'$.

The operation will now be described hereinlater.

Referring to the flow chart of FIG. 3 depicting the control routine of the controller 32, at step 100 the left front wheel speed NFL and the right front wheel speed NFR are read and at step 101 the curve radius R of the cornering vehicle is calculated whilst at step 102 the centripetal acceleration Yg of the cornering vehicle is calculated.

Assuming that V is a running speed of a vehicle and $\psi$ is a yaw rate, the curve radius R and the centripetal acceleration Yg of the cornering vehicle are calculated by using the following expressions.

$$V = \{(NFL + NFR)/2\}/r$$
$$= K1 \cdot |NFL + NFR|$$
$$R = V/\psi$$
$$= K2 \cdot |(NFL + NFR)/(NFL - NFR)|$$
$$Yg = V^2/R$$
$$= K3 \cdot |(NFL + NFR) \times (NFL - NFR)|$$

where K1, K2, K3 are constants determined depending on the specification of the associated vehicle and r is a radius of a tire.

At step 103, the slip limiting force $\Delta T$ is determined based on the curve radius R and the centripetal acceleration Yg which are determined at steps 101 and 102 and on a predetermined control map.

At step 104, the left rear wheel speed NRL and the right rear wheel speed NRR are read.

At step 105, the driving wheel slip $\Delta Nfr$ is calculated.

The driving wheel slip $\Delta Nfr$ is calculated by using the following expression, i.e., the driving wheel slip $\Delta Nfr$ is determined by the difference between the average rear wheel speed NRave and the average front wheel speed NFave.

$$\Delta Nfr = NRave - NFave$$
where $NRave = \frac{1}{2}(NRL + NRR)$ and
$NFave = \frac{1}{2}(NFL + NFR)$ At step 106, the slip limiting force decrease $\Delta T'$ is determined based on the driving wheel slip $\Delta Nfr$ determined at step 105 and a predetermined characteristic, e.g. a linear function as shown.

At step 107, the final slip limiting force $\Delta T^*$ ($=\Delta T - \Delta T'$) is calculated by the slip limiting force $\Delta T$ determined at step 103 and the slip limiting force decrease $\Delta T'$ determined at step 106.

At step 108, a valve operating signal (i) is supplied to the slip limitation control valve 31 so that the slip limiting clutch 20 is urged for engagement so as to produce the aforementioned final slip limiting force $\Delta T^*$.

If the cornering inside driving wheel is lifted above the ground to slip during, for example, power slide running, the driving wheel slip $\Delta Nfr$ is detected from the average speed differential between the driving wheels 16, 17 and the non-driving wheels 18, 19. The slip limiting force $\Delta T^*$ is then obtained by subtracting the slip limiting force decrease $\Delta T'$ corresponding to the driving wheel slip $\Delta Nfr$ from the slip limiting force $\Delta T$ which is brought into effect when there is no slip of the driving wheels 16, 17.

Accordingly, when a driving wheel slip takes place, the slip limiting force decreases in proportion to the driving wheel slip $\Delta Nfr$, whereby the driving force distributed to the cornering outside driving wheel decreases for thereby preventing production of a moment causative of an oversteer and thereby preventing an excessive oversteer.

From the foregoing, it will be understood that the present invention makes it possible to improve the driveability and the controllability during cornering of the vehicle at the same time.

While the present invention has been described and shown as above, it is not limitative. For example, while in the embodiment occurrence of a driving wheel slip, i.e., an oversteer condition where a larger driving force is distributed to the cornering outside driving wheel than the cornering inside driving wheel is detected from the average speed difference between the driving wheels and the non-driving wheel, it may otherwise be detected from the rotation speeds of the left and right driving wheels so as to estimate an otherwise occurring excessive oversteer from the slip of the inside driving wheel of the cornering vehicle. That is, at the initial period of the vehicle cornering where lifting of the inside driving wheel does not yet occur, the inside and outside wheels can be discriminated by reference to the relation of Nin<Nout (where Nin is the rotation speed of the cornering inside wheel and Nout is the rotation speed of the cornering outside wheel) resulting from the cornering curve difference between the inside and outside driving wheels. After that, detection is made to the rotation speed of the left rear wheel NRL and the rotation speed of the right rear wheel NRR to know occurrence of the driving wheel slip when there is caused the relation of Nin<Nout so that $\Delta$Nio ($=$Nin$-$Nout) can represent a driving wheel slip.

Further, while the slip limiting force has been described and shown as being determined from the curve radius R and the centripetal acceleration Yg of the cornering vehicle, it may otherwise be determined from the vehicle running speed V and the centripetal acceleration Yg or from the curve radius R and the vehicle speed V, i.e., the slip limiting force may otherwise be determined from any other information so as to apply a slip limiting force to the left and right driving wheels to improve the power supplying characteristic during cornering of the vehicle, i.e., the driveability of the vehicle.

Further, while the slip limiting force decrease has been described and shown as being linearly proportional to the driving wheel slip decrease, the former may otherwise be non-linearly proportional to the latter, i.e., the relation between the slip limiting force decrease and the driving wheel slip decrease may be represented by a quadratic curve or function of secondary degree.

What is claimed is:

1. A method of controlling a slip of a differential for a wheeled vehicle, the differential being of the type incorporating a clutch variable in engagement for producing a slip limiting force for limiting a differential action even during cornering of the vehicle, the method comprising:
   detecting a driving wheel slip during cornering of the vehicle;
   reducing a force urging the clutch for engagement and thereby reducing the slip limiting force in proportion to an increase of the driving wheel slip, wherein said detecting comprises the steps of:
   detecting rotation speeds of a set of front dirigible wheels;
   calculating a curve radius of the cornering vehicle by using the rotation speeds of the front dirigible wheels;
   calculating a centripetal acceleration of the cornering vehicle by using the rotation speeds of the front dirigible wheels;
   determining a basic slip limiting force based on the curve radius and the centripetal acceleration of the cornering vehicle and on a predetermined map;
   detecting rotation speeds of a set of rear driving wheels; and
   calculating the driving wheel slip by using an average front wheel speed and an average rear wheel speed.

2. The method as set forth in claim 1 wherein said reducing comprises the steps of:
   determining a slip limiting force decrease based on the driving wheel slip and a predetermined characteristic; and
   calculating the slip limiting force by subtracting the slip limiting force decrease from the basic slip limiting force.

3. In a vehicle having a set of front dirigible wheels, a set of rear driving wheels and a differential interposed between said rear wheels, a slip control device for the differential comprising:
   a pressurized oil source;
   a hydraulic clutch incorporated in the differential and communicable with said pressurized oil source for supplying a slip limiting force to the differential to limit a differential action thereof;
   a control means interposed between said pressurized oil source and said hydraulic clutch for controlling supply of pressurized oil from said pressurized oil source to said hydraulic clutch;
   a first means for detecting rotation speeds of the front dirigible wheels,
   a second means for detecting rotation speeds of the rear driving wheels, and
   a controller having means for determining a rear driving wheel slip during cornering of the vehicle by using the detected front dirigible wheel speeds and the detected rear driving wheel speeds and controlling said control means in such a way that the slip limiting force reduces in proportion to the increase of the rear driving wheel slip during cornering of the vehicle.

* * * * *